United States Patent
Hui et al.

(10) Patent No.: US 7,983,253 B2
(45) Date of Patent: Jul. 19, 2011

(54) TIME-SPACE CARRIER SENSE MULTIPLE ACCESS

(75) Inventors: Joseph Hui, Fountain Hills, AZ (US); David A. Daniel, Scottsdale, AZ (US)

(73) Assignees: Nuon, Inc., Scottsdale, AZ (US); Arizona Board of Regents for and on behalf of Arizona State University, Phoenix, AZ (US)

( * ) Notice: Subject to any disclaimer, the term of this patent is extended or adjusted under 35 U.S.C. 154(b) by 166 days.

(21) Appl. No.: 12/148,708

(22) Filed: Apr. 21, 2008

(65) Prior Publication Data

US 2008/0279209 A1    Nov. 13, 2008

Related U.S. Application Data

(60) Provisional application No. 60/925,415, filed on Apr. 20, 2007.

(51) Int. Cl.
*H04L 12/50* (2006.01)
*H04Q 11/00* (2006.01)
*H04L 12/413* (2006.01)

(52) U.S. Cl. ........................ 370/388; 370/445

(58) Field of Classification Search ................. None
See application file for complete search history.

(56) References Cited

U.S. PATENT DOCUMENTS

| | | | | |
|---|---|---|---|---|
| 6,141,355 A * | 10/2000 | Palmer et al. | ................. | 370/465 |
| 6,157,643 A * | 12/2000 | Ma | .................. | 370/389 |
| 6,775,235 B2 * | 8/2004 | Datta et al. | .................... | 370/238 |
| 7,180,875 B1 * | 2/2007 | Neumiller et al. | ............ | 370/329 |
| 2003/0154324 A1 * | 8/2003 | Harding et al. | .................... | 710/1 |
| 2006/0013207 A1 * | 1/2006 | McMillen et al. | ............ | 370/388 |
| 2006/0092840 A1 * | 5/2006 | Kwan et al. | ................ | 370/230.1 |
| 2006/0104298 A1 * | 5/2006 | McAlpine et al. | ............ | 370/412 |

FOREIGN PATENT DOCUMENTS

EP    1732271 A1 * 12/2006

* cited by examiner

*Primary Examiner* — Xavier Szewai Wong
(74) *Attorney, Agent, or Firm* — Robert C. Klinger

(57) ABSTRACT

A scalable switch, a system of switches and methods, configured to sense a carrier at the output of the respective switch. The invention intelligently, and dynamically, controls the connection of a respective switch input to a respective switch output as a function of a carrier being present, or absent, at a selected output. The present invention provides a switching system that is scalable, and not limited as are Stored Program Control (SPC) type switches.

9 Claims, 4 Drawing Sheets

TIME-SPACE CARRIER SENSE MULTIPLE ACCESS

CLAIM OF PRIORITY

This application claims priority of U.S. Provisional Ser. No. 60/925,415 entitled "SPACE-TIME CARRIER SENSE MULTIPLE ACCESS" filed Apr. 20, 2007, the teachings of which are incorporated herein by reference.

FIELD OF THE INVENTION

The present invention relates to a switching technique that extends the Carrier Sense Multiple Access (CSMA) network control protocol.

BACKGROUND OF THE INVENTION

CSMA is a protocol in which a node senses the presence or absence of a carrier (i.e. data traffic) on a shared transmission medium before attempts to transmit to an intended receiver node. If a carrier is not sensed, an Ethernet frame is transmitted, otherwise, a node waits a random delay before sensing the carrier again in a new attempt to transmit. The goal of CSMA is to avoid collisions (concurrent interfering transmission by multiple nodes) by transmitting at a random time upon sensing a carrier. Currently, 1 Gbps, 10 Gbps or greater Ethernet transmission is available using electrical Ethernet interface based on 1 GBASE-T, 10 GBASE-T or follow-on standards.

SUMMARY OF INVENTION

The present invention achieves technical advantages and methods, as a scalable switch, a system of switches and methods, configured to sense a carrier at the output of the respective switch. The invention intelligently, and dynamically, controls the connection of a respective switch input to a respective switch output as a function of a carrier being present, or absent, at a selected output. The present invention provides a switching system that is scalable, and not limited as are Stored Program Control (SPC) type switches.

DETAILED DESCRIPTION OF THE PRESENT INVENTION

Figure 2:
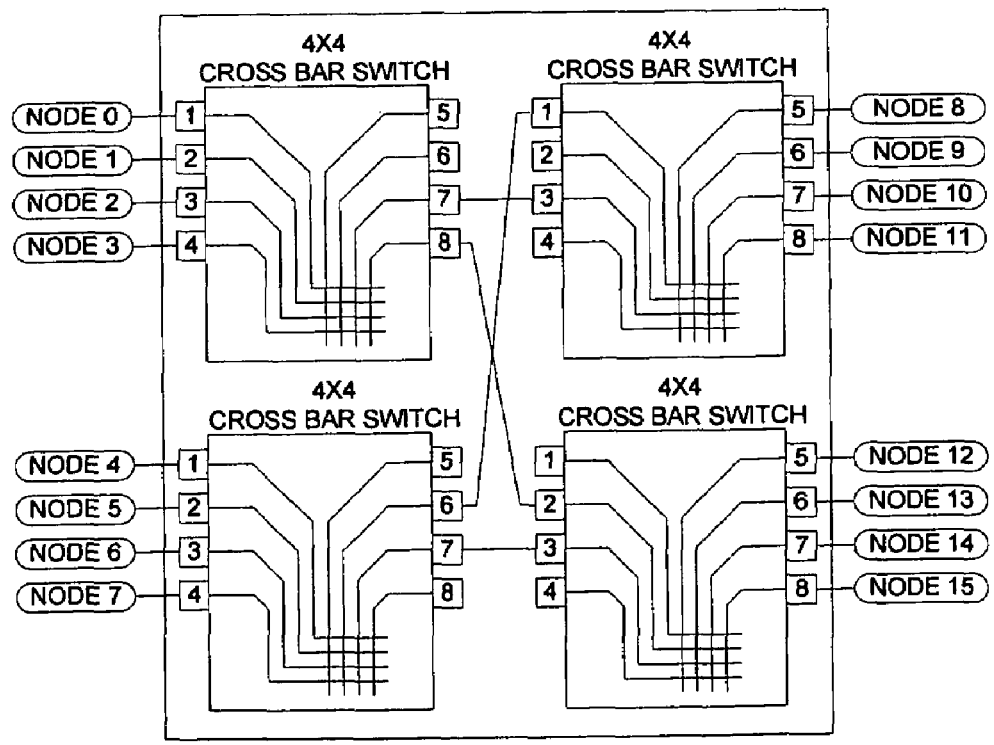
FIG. 2 depicts an Example of a Multi-stage Interconnect Network Topology: "2-Stage SS"

In a given network employing CSMA, the end-to-end connection established between two nodes may involve any number of cross bar switches (CBS) that can be interconnected in stages to form a circuit. The end-to-end circuit defines the collision domain in which the absence or presence of a carrier must be detected. Refer to FIG. 2, Example Multi-stage Interconnection Network Topology: "2-Stage SS".

Currently, there are two main techniques that extend (modify or enhance) the CSMA protocol:

Carrier Sense Multiple Access with Collision Detection (CSMA/CD): In this modification a node follows the basic CSMA protocol—verifying the medium is not busy before transmitting—but with this enhancement, after a node begins transmitting, it must listen (monitor the medium) to detect a collision. A transmitting node may detect a collision using any one of various techniques, but it typically involves comparing transmitted data to received data; if they are different, it is assumed to be due to a collision and a jamming signal is transmitted immediately. The jamming signal causes any conflicting nodes to stop their transmission and back off by random amounts of time before reattempting transmission.

Carrier Sense Multiple Access with Collision Avoidance (CSMA/CA): This modification requires a handshake before transmission. The transmitting node issues a Request-to-Send (RTS) and must receive back a Clear-to-Send (CTS) from the intended receiving node, before beginning a transmission. The handshake serves as a notification to all other nodes to refrain from transmitting, thus avoiding collisions. This extension to the CSMA protocol is primarily intended for use with wireless transmission mediums where CSMA/CD won't work because it is not possible for a node to listen while transmitting to detect a collision.

Both CSMA/CD and CSMA/CA utilize timing (temporal switching) of the transmission to avoid collision. However, temporal switching is but one of the two foundational concepts in circuit switching theory; the second concept is spatial switching. Up to now, spatial switching has not been applied to extend CSMA. The invention introduces a third technique that utilizes spatial switching to enhance the CSMA protocol and is designated from this point forward as "Time-Space Carrier Sense Multiple Access (CSMA/TS)".

Figure 1:
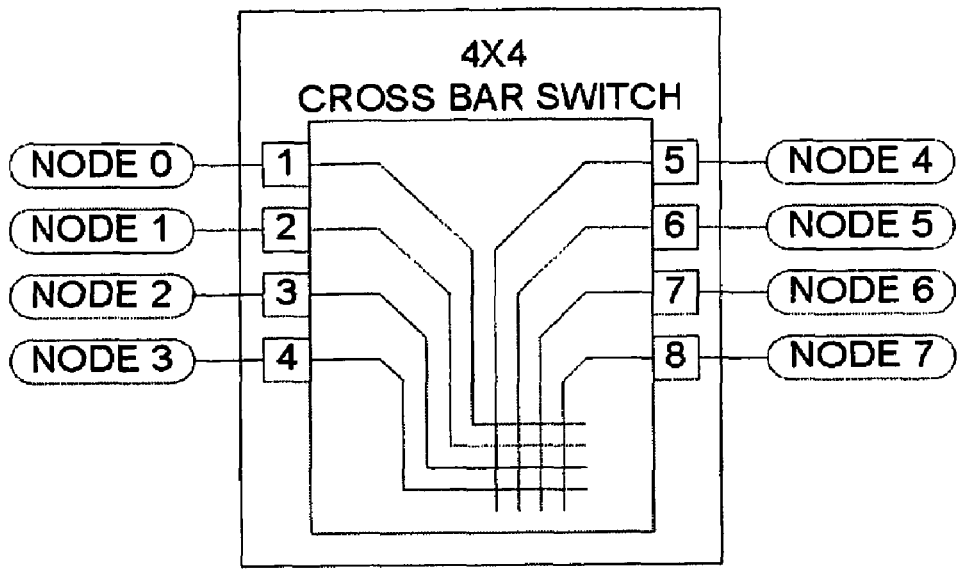
FIG. 1 depicts a single-stage Multi-Stage Interconnect Network (MIN) topology utilizing a Cross Bar Switch.

The simplest case for applying CSMA/TS, such as shown in FIG. 1, is in using a single stage network or switch, or "crossbar" in which any input may be selected to connect to any output.

FIG. 2 is an example of a very simple multistage interconnect network (MIN). MINs can in fact be very complex, particularly in Facility Switching applications. Note that each segment shown in the MIN diagram represents 4-pair balanced signaling for 1 GBASE-T and 10 GBASE-T switched in tandem.

As 10 Gb/s node connections becomes common and cumulative network traffic scales beyond the terabit per second (Tb/sec=$10^{12}$ bps) range, routing of packets through these complex MINs becomes very complicated. Just 1000 Tb/sec lines would combine for an aggregate data rate of 1 petabit per second (Pb/sec=$10^{15}$ bps). At such data rates, the existing packet switching approach becomes a problem. Emerging and proposed high data-rate virtualization protocols such as iSCSI and i-PCI will require new switching technologies to gain widespread acceptance and in turn—as they gain popularity—have the potential to actually fuel the momentum for change in switching. i-PCI in fact requires a minimum 10 Gbps network infrastructure. CSMA/TS is viewed as a key enabler for widespread adoption of these virtualization protocols.

CSMA/TS eliminates the need for a separate NIC at the input and output of each MIN, thus reducing the power requirement for complex MINs. CSMA/TS may be considered a "Green" technology.

The switches in these MINs are typically designed for centralized Stored Program Control (SPC). With the SPC approach, a controller determines the path to route each packet through the MIN based on the Media Access Control (MAC) address. This centralized packet switch control does not scale very well when it becomes necessary to add additional switching capability to handle more nodes and traffic. CSMA/TS addresses this scalability by introducing a unique distributed step-by-step carrier sensing approach for MAC address path control. Path control under CSMA/TS becomes distributed and modularized and thus readily scalable.

Classical circuit switching uses either the aforementioned centralized Stored Program Control (SPC) or distributed Step-By-Step (SBS) methods to route a connection through the MIN with M inputs and N outputs.

A MIN with s-stages is defined for each stage k, for $1 \leq k \leq s$, to have $n_k$ crossbar switches of size $n_{k-1} \times n_{k+1}$. We define $n_0 = M/n_1 \equiv m$ and $n_{s+1} = N/n_s \equiv n$. Thus a switch at stage k is connected to each switch at stage k−1 and stage k+1 by one link. An example of a MIN topology is shown in FIG. 1 with M=N=8, called an SS network with s=2, m=n=4, $n_1$=2 switches of size 4×4 and $n_2$=2 switches of size 4×4.

Figure 3:
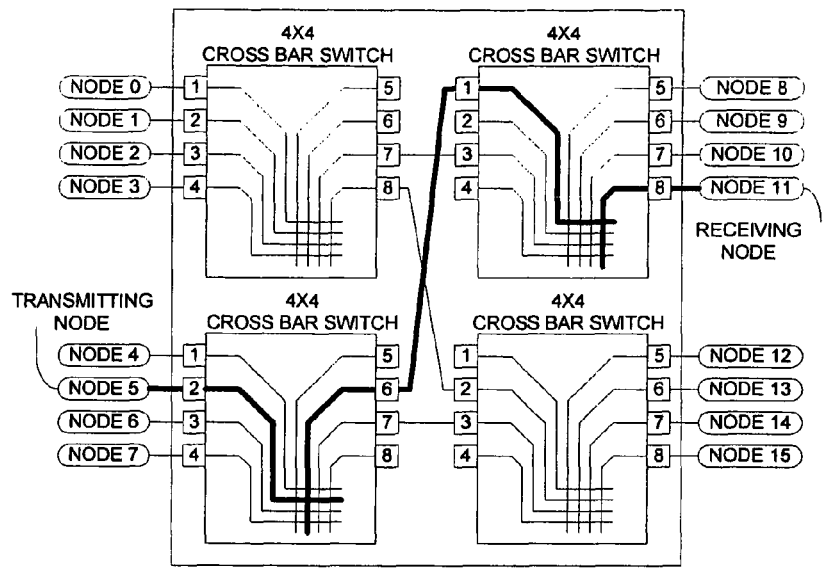
FIG. 3 depicts an example of a connection/path through the switch of FIG. 2.

An end-to-end connection, such as shown in FIG. 3 established between two nodes (nodes 5 and 11), is formed by closing a crosspoint in cross bar switches (CBS) in successive stages of the MIN to create a path.

With the SPC approach, a controller determines the path to route each circuit using a memory map of established connections. SPC has the disadvantage that connection requests are completed sequentially and centrally, which is not fast enough for Ethernet frame routing in a MIN. Instead of using a MIN to switch Ethernet frame by frame, Virtual LAN's (VLAN) are configured to interconnect LANs using semi-permanent circuits facilitated by use of a MIN. Advantageously, the present invention performs carrier sensing the MIN directly to form a path. A connection request searches for a free path in a MIN step-by-step using carrier sensing.

One advantageous aspect of the present invention utilizes SBS carrier sensing, for which carrier sensing is done not only temporally, but also spatially in a MIN step-by-step. This step-by-step route search is done as a precurser to establish the route prior to the transmission of the actual data. This advantageously avoids the need for maintaining large memory maps to track established connections.

In current designs, an Ethernet switch translates the destination Ethernet address via a table into segment addresses. For CSMA/TS a different more scalable approach is used. For CSMA/TS the NIC associated with a node translates the destination Ethernet address via a table into MIN segment addresses. For the SS MIN topology shown in FIG. 3, an output node is addressed by two consecutive segment addresses. For example, consider node 5 sending an Ethernet frame to node 11. An Ethernet address translation table in node 5 would map the Ethernet address of node 11 into the segment addresses (6, 8), which are the outputs of the consecutive switches en-route to node 11. This (6, 8) address is used for step-by-step path setup. The first stage switch connects node 5 to output 6. Node 5 then senses if there is a carrier. If not, node 5 connects to output 8 of the next switch and performs carrier sensing again. Simply speaking, a NIC senses carrier in a step-by-step manner, and if a carrier is sensed in any one of the steps, collision avoidance (CSMA/CA) is exercised via delayed transmission.

In multi-stage carrier sensing, the present invention distinguishes two modes of control. First, a persistent CSMA/TS-P for which links sensed idle are seized and not released even if downstream links are found busy. For example in FIG. 3, node 5 may seize the idle output 6. When it proceeds to sense output 8 in the next stage switch, it may sense a carrier as another input node may be sending data at the same time to node 11. The seized output 6 in the first stage is not released, despite node 11 being sensed busy. Node 5 completes the connection when node 11 is sensed idle later.

Alternatively, a fast release CSMA/TS-FR may release links in an earlier stage should later stage links be found busy. In this example, output 6 in the first stage is released after node 11 is sensed to be busy. Another attempt to connect to output 11 is attempted after a random delay.

Traditional CSMA/CA (Collision avoidance) or CSMA/CD (Collision Detection) retransmits Ethernet frames after a random time delay when the Ethernet is found to be busy. Undesirable delay is therefore incurred. CSMA/TS can retransmit the Ethernet frame over random space instead of random time delay, thus reducing delay.

Figure 4:
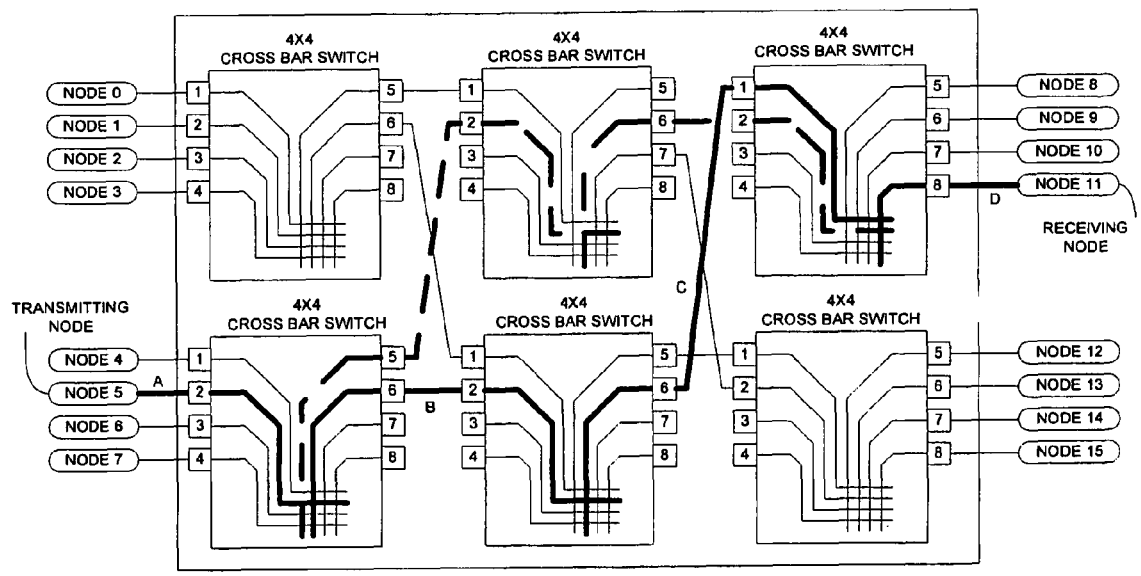
FIG. 4 depicts a 3 Stage SSS MIN Topology with a path therethrough.

To improve reliability and throughput, a Clos "SSS" configuration is often used. In the Clos SSS configuration, there is more than one path between two nodes as shown in FIG. 4 for a MIN Topology SSS. The $1^{st}$ and $3^{rd}$ stage switches could be considered as access switches, for which a significant traffic concentration may be achieved. The $2^{nd}$ stage switches provide alternative paths in the Clos network.

In this simplified example, there are two possible paths through the MIN (either the solid bold black route or the dashed bold black route). For example, input node 5 may choose the bold solid black route labeled "ABCD". It then establishes the path step-by-step similar to that of the SS MIN. If the NIC detects a carrier in intermediate segments, it immediately tries the alternative bold dashed path. In that case CSMA randomizes transmission over space. If a carrier is detected in the final segment, no alternative path would work either, and CSMA then may have to randomize transmission over time by carrier sensing after a random delay.

In the example of FIG. 4, the path decision point is made at segment B. If a carrier is sensed on any link of the path marked bold solid, it immediately chooses the dashed path as part of the protocol and blocking internal to the switch occurs only if all alternative paths are blocked. There are as many alternative paths are there are $2^{nd}$ stage switches in this SSS network. In FIG. 4, the SBS carrier sensing first senses if segment B has a carrier. After segment B is sensed idle, carrier sensing is performed for each subsequent segment. If a carrier is sensed at C, the NIC releases segment B. This is termed CSMA/TS-FR. The input node then tries to sense the carrier step-by-step in the alternative dashed path.

If both B and C are sensed idle, carrier sensing proceeds to segment D connecting to the output node 11. If a carrier is sensed, there is an output conflict of node 11 for which no alternative path searching can avoid. In this case, segments B and C may be persistently maintained until segment D becomes idle. This is called 3-Stage CSMA/TS-P, though there can be a fast release of the earlier stage segment B should C be found busy, or if desired.

Alternatively, the present invention may fast release segments B and C when segment D is found busy. Since carrier sensing an alternative path (such as the dashed path) will not avoid an output conflict, input node 5 may only attempt transmission at a later random time. This is called 3-Stage CSMA/TS-FR.

Figure 5:
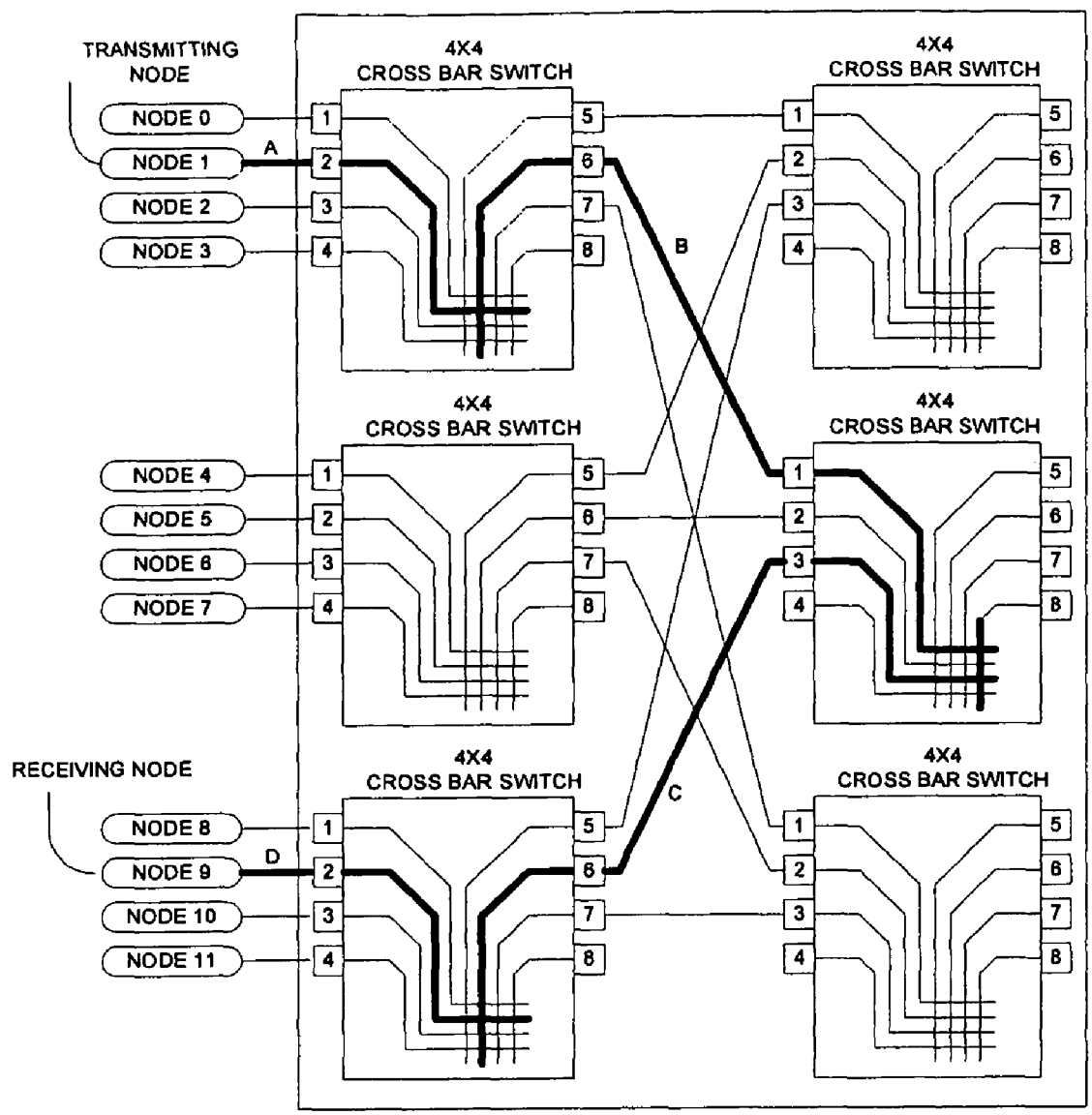
FIG. 5 depicts a Folded SSS Ethernet Switch Topology with a path therethrough.

FIG. 5 shows an Ethernet Switch for which links are full-duplex and the three stages of a Clos network are folded into 2 stages for easier implementation.

With alternative paths, an SSS MIN with CSMA suffers little or no internal blocking. Since path searching is done per input in a distributed manner, parallel searching is accomplished. This makes path searching in a MIN independent of the size of the MIN and the switch is highly scalable without creating a path search bottleneck as is often the case for SPC switching For carrier sensing of each segment, CSMA/TS includes (but is not limited to) two possible approaches.

In the first approach, the individual switches are intelligent and perform the actual carrier sensing and signal the presence or absence of a carrier for that particular segment by sending a busy or idle indication back to the NIC. The NIC is responsible for tracking progress through the MIN.

Figure 6:
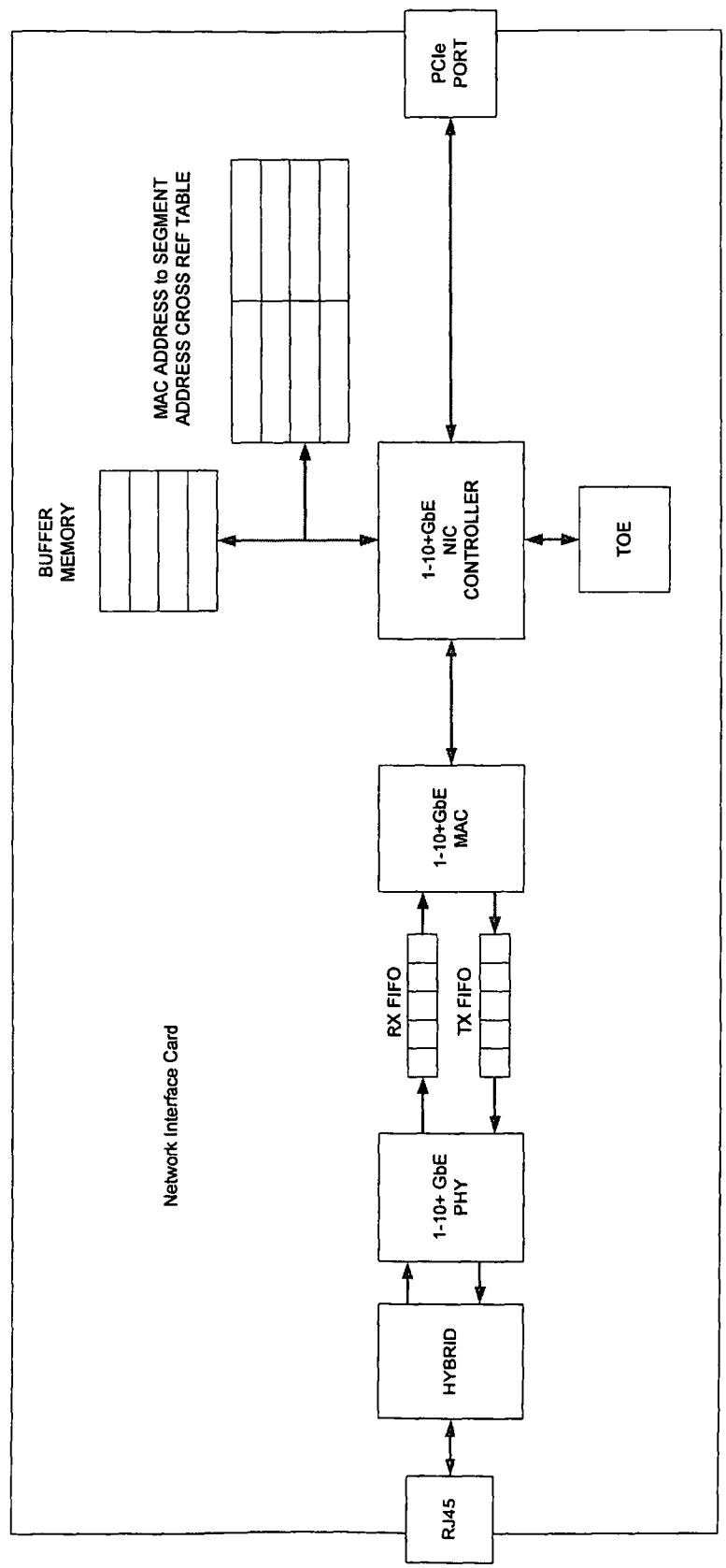
FIG. 6 depicts a NIC controlling a multi-level switch.

In a second approach, referring to FIG. 6, all intelligence resides with the NIC. The NIC performs the carrier sensing remotely and switches at each stage. Similar to Ethernet switches, a NIC translates the destination Ethernet address via a table into segment addresses. This translation or cross-reference table is resident onboard each Network Interface Card. This table 1 below is updated periodically or when ever a NIC is brought on line.

For the 2-Stage SS MIN topology an output node is addressed by two consecutive segment addresses. For example consider node 5 sending an Ethernet frame to node 11 in FIG. 3, Example Multi-stage Interconnect Network Topology: "2-Stage SS". A MAC Address to Segment address translation table resident on the node 5 NIC would map the Ethernet address of node 11 into the segment addresses (6, 8), which are the outputs of the consecutive switches en-route to node 11. This (6, 8) address is used for step-by-step path setup. The first stage switch connects node 5 to output 6. Node 5 then senses if there is a carrier. If not, node 5 connects to output 8 of the next switch and performs carrier sensing again. Simply speaking, a NIC senses carrier in a step-by-step manner, and if a carrier is sensed in any one of the steps, collision avoidance (CSMA/CA) is exercised via delayed transmission.

Table 1 below, Example Segment ← → MAC Address Mapping for Node 5 shows the MAC Address to Segment Cross Ref Table shown on the Network Interface Card in FIG. 1, filled out as an example for Node 5 in FIG. 3, Example Multi-stage Interconnect Network Topology: "2-Stage SS".

TABLE 1

Example Segment ← → MAC Address Mapping for Node 5:

| DESTINATION NODE | SEGMENT | NODE MAC ADDRESS |
|---|---|---|
| 8 | (6, 3) | 192.168.0.1 |
| 9 | (6, 4) | 192.168.0.2 |
| 10 | (6, 5) | 192.168.0.3 |
| 11 | (6, 8) | 192.168.0.4 |
| 12 | (5, 3) | 215.104.0.1 |
| 13 | (5, 4) | 215.104.0.2 |
| 14 | (5, 5) | 215.104.0.3 |
| 15 | (5, 8) | 215.104.0.4 |

In both cases, for 3-stage networks the $1^{st}$ stage switch has the responsibility for determining the first stage output connection, as it has first hand knowledge of which output is not busy and alternative routes through the MIN are defined by the output of the $1^{st}$ stage. Thus, idle outputs of a $1^{st}$ stage switch can be assigned conflict free. After the $1^{st}$ stage, the remainder of the route in a 3-stage network is uniquely determined by the destination Ethernet address.

Advantageously, this invention includes:

A new technique of carrier sensing to establish a path through a MIN. The technique utilizes spatial switching—in addition to temporal switching—to define an third major enhancement to the CSMA protocol. This enhancement is referred to as Time-Space Carrier Sense Multiple Access (CSMA/TS).

A unique decentralized MIN control approach that addresses MIN scalability and reduces latency by introducing a distributed step-by-step carrier sensing protocol for MAC address path determination and control.

Two modes of control are presented and defined:
1. CSMA/TS-P: A persistent control, in which links sensed idle are seized and not released even if downstream links are found busy.
2. CSMA/TS-FR: A fast release control, in which links in a earlier stage links are released if later stage links are found busy.

Switch and routing capability and responsibility integrated into the NIC at each node, rather than at the switch itself, thus by default enabling a distributed and scalable switching architecture. As nodes are added, the switching capability increases right along with the nodes.

A preferred embodiment is the implementation of the CSMA/TS protocol in an SSS topology MIN.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. A multi-stage interconnect network (MIN) switch, comprising:
a first switch having a plurality of inputs and a plurality of outputs with first segments therebetween;
a plurality of second switches each having a plurality of inputs and a plurality of outputs with second segments therebetween, at least some of said second switch inputs coupled to one of the first switch outputs;
a third switch having a plurality of inputs and a plurality of outputs with third segments therebetween, at least some of said third switch inputs coupled to one of the plurality of second switch outputs; and
a node configured to control each of the first switch segments, the second switch segments and the third switch segments to establish a first path from a selected one of the first switch inputs to a selected one of the third switch outputs, the node configured to provide carrier sensing and establish alternative path routing on a segment-by-segment basis, wherein the node is configured to establish a selected said first switch segment, establish a selected said second switch segment, and responsively establish a selected said third switch segment as a function of whether a carrier is present at the selected third switch output associated with the selected third switch segment.

2. The switch as specified in claim 1 wherein the node is configured to responsively establish the selected second switch segment as a function of whether a carrier is present at the selected second switch output associated with the selected second switch segment.

3. The switch as specified in claim 1 wherein the node is configured to release at least one of the selected first switch segments or the selected second switch segments if a carrier is present at the selected third switch outputs associated with the selected third switch segment.

4. The switch as specified in claim 1 wherein the node is configured to maintain at least one of the first switch segments or the selected second switch segments if a carrier is present at the selected third switch outputs associated with the selected third switch segment.

5. The switch as specified in claim 1 wherein the node is configured to utilize another one of said first switch segments or said second switch segments if a selected said segment in the first path has a carrier at its respective output, thereby establishing a second path between the selected first switch input to the selected third switch output.

6. The switch as specified in claim 1 wherein the node is a network interface card (NIC).

7. The switch as specified in claim 1 wherein the MIN switch is configured to communicate Ethernet frames.

8. The switch as specified in claim 1 wherein the MIN switch is configured to establish the first path using a Media Access Control (MAC) address to determine the segments utilized in establishing the first path.

9. The switch as specified in claim 1 wherein the MIN switch is configured to establish the first path without using a memory map.

* * * * *